(12) United States Patent
Blondé et al.

(10) Patent No.: US 7,914,155 B2
(45) Date of Patent: Mar. 29, 2011

(54) DEVICE FOR DISPLAYING COLOR IMAGES

(75) Inventors: Laurent Blondé, Thorigne Fouillard (FR); Khaled Sarayeddine, Thorigne Fouillard (FR); Jonathan Kervec, Paimpont (FR)

(73) Assignee: Thomson Licensing, Boulogne-Billancourt (FR)

( * ) Notice: Subject to any disclaimer, the term of this patent is extended or adjusted under 35 U.S.C. 154(b) by 517 days.

(21) Appl. No.: 10/564,499

(22) PCT Filed: Jul. 12, 2004

(86) PCT No.: PCT/FR2004/050329
§ 371 (c)(1),
(2), (4) Date: Jul. 14, 2006

(87) PCT Pub. No.: WO2005/011288
PCT Pub. Date: Feb. 3, 2005

(65) Prior Publication Data
US 2007/0024813 A1  Feb. 1, 2007

(30) Foreign Application Priority Data
Jul. 17, 2003 (FR) .................................... 03 08699

(51) Int. Cl.
*G03B 21/14* (2006.01)
*G02B 5/22* (2006.01)

(52) U.S. Cl. .......................................... 353/84; 359/890

(58) Field of Classification Search .................... 353/84, 353/30, 31, 32; 348/742, 743; 359/890; 362/219
See application file for complete search history.

(56) References Cited

U.S. PATENT DOCUMENTS

| | | | |
|---|---|---|---|
| 6,567,134 B1 | 5/2003 | Morgan | |
| 6,753,829 B2 * | 6/2004 | Ouchi | 345/32 |
| 6,827,451 B2 * | 12/2004 | Belliveau | 353/31 |
| 7,283,181 B2 * | 10/2007 | Allen et al. | 348/744 |
| 2001/0055081 A1 * | 12/2001 | Shigeta | 349/106 |
| 2002/0109821 A1 | 8/2002 | Huibers et al. | |

FOREIGN PATENT DOCUMENTS
EP       0749250       12/1996

OTHER PUBLICATIONS
Search Report Dated Jan. 24, 2005.

* cited by examiner

*Primary Examiner* — William C Dowling
*Assistant Examiner* — Ryan Howard
(74) *Attorney, Agent, or Firm* — Robert D. Shedd; Robert B. Levy; Jorge Tony Villabon

(57) ABSTRACT

A display device comprises revolving coloured wheels, so as to generate a periodic coloured beam, and an imager which modulates the coloured beam as a function of a received video signal. The coloured beam (8) takes successively at each period a plurality of primary colours in synchronism with the images generated by the imager for each primary colour.
By adjustment of the relative position of the coloured wheels, it is possible to modify the hue of the primary colours so as to best match them to the received video signal.

2 Claims, 4 Drawing Sheets

DEVICE FOR DISPLAYING COLOR IMAGES

This application claims the benefit, under 35 U.S.C. §365 of International Application PCT/FR04/050329, filed 12 Jul. 2004, which was published in accordance with PCT Article 21(2) on 3 Feb. 2005 in French and which claims the benefit of French patent application No. 0308699, filed 17 Jul. 2003.

CROSS-REFERENCE TO RELATED APPLICATIONS

N/A

STATEMENT REGARDING FEDERALLY SPONSORED RESEARCH OR DEVELOPMENT

N/A

NAMES OF THE PARTIES TO A JOINT RESEARCH AGREEMENT

N/A

BACKGROUND OF THE INVENTION

1. Field of the invention

The invention relates to a device for displaying colour images.

2. Description of Related Art

In devices for displaying colour images, the colour displayed at each point is generally obtained through the combination by additive synthesis of several primary colours. The weighting of the various colours in the combination determines the colour displayed.

Combination by additive synthesis of the primary colours may take varied forms. It may be carried out by the superposition of various beams which each correspond to a primary colour. According to another solution, used for example in mono-imager projectors and back-projectors (which use a single imager or modulator to process the whole set of primary colours), the combination is obtained through the very fast succession of the displaying of each primary colour, that the eye integrates into a resultant colour (sequential procedure).

Conventionally, three primary colours are used. In most display systems these three primary colours are red, green and blue. Through the combination of these three colours with variable weightings, it is possible to obtain at each point a wide range of colours, which describes according to the conventional chromaticity representations (CIE type) the area of a triangle whose vertices represent the primary colours.

In display devices which use such a solution, the set of colours that can be displayed is therefore limited and determined during design as a function of the primary colours used. For example, in a projector or a back-projector whose primary colours are obtained through the successive passage of coloured filters in front of a white light source, the colours of the filters fix the vertices of the triangle whose surface corresponds to the set of colours that can be displayed by the projector or back-projector.

In order to improve the brightness of such a display device, patent application EP 0 749 250 has proposed that the saturation of the primary colours be varied by radial displacement of a specific coloured wheel with respect to the light beam. This coloured wheel presents saturated colours at the centre and becomes progressively desaturated at the periphery. The user can thus alter the brightness at will and, in an inverse manner, the saturation of the images displayed.

However, this solution only very specifically extends the possibilities of obtaining colours by the display device. In particular, the effect is necessarily identical over the whole set of primary colours. Moreover, the result obtained is comparable with conventional brightness adjustment.

In order to compensate for the degradation of the filters over time, patent application WO 95/11 572 proposes that the intensity of the light source be rendered adjustable independently for each filter. This adjustment thus makes it possible to modify as in the previous solution the saturation of the primary colours, but also leaves the hue of each unchanged, thereby limiting the possibilities of adjustment. Moreover, the variation in the intensity at the frequency of passage of the filters renders the power supply system of the lamp complex.

BRIEF SUMMARY OF THE INVENTION

The invention aims to improve the colour rendition of display devices.

With this aim, it proposes a display device in which the colour at a point is obtained by the combination of at least one first and one second primary colours, comprising means for modifying the hue of the first primary colour.

In preferred fashion, the device comprises means of reception of a video signal and means of determination of the hue of the first primary colour as a function of the video signal.

Thus, primary colours which are best matched to the images to be displayed are used.

The invention also proposes a display device comprising means of generation of a periodic coloured beam and means of modulation of the coloured beam as a function of a received video signal, the coloured beam taking successively at each period a plurality of primary colours, comprising means for modifying the hue of at least one of the said primary colours.

Preferably, the device comprises means of determination of the said hue as a function of the received video signal.

The invention proposes for example that the means of generation comprise a first and a second coloured wheels successively traversed by a luminous beam, each coloured wheel carrying a plurality of coloured filtering sectors and being driven in rotation, and that the position of the second coloured wheel relative to the first coloured wheel be variable.

Preferably, the device includes means of determination of the said position as a function of the received video signal.

In order to preserve the initial appearance of the images to be displayed, the device can comprise means of processing the video signals received as a function of the said hue. In particular, the means of processing generate data intended for the means of modulation.

The invention also proposes a display device comprising means of generation of a coloured beam and means of modulation of the coloured beam, the means of modulation generating during a determined duration an image to be displayed in a determined colour, in which the coloured beam takes successively at least two distinct colours during the determined duration so as to obtain the determined colour as resultant.

Advantageously, the coloured beam takes one at least of the said distinct colours for a variable duration so as to vary the said determined colour.

BRIEF DESCRIPTION OF THE DRAWINGS

Other characteristics and advantages of the invention will become apparent in the light of the detailed description which follows offered with reference to the appended figures, in which.

DETAILED DESCRIPTION OF THE INVENTION

Figure 1:
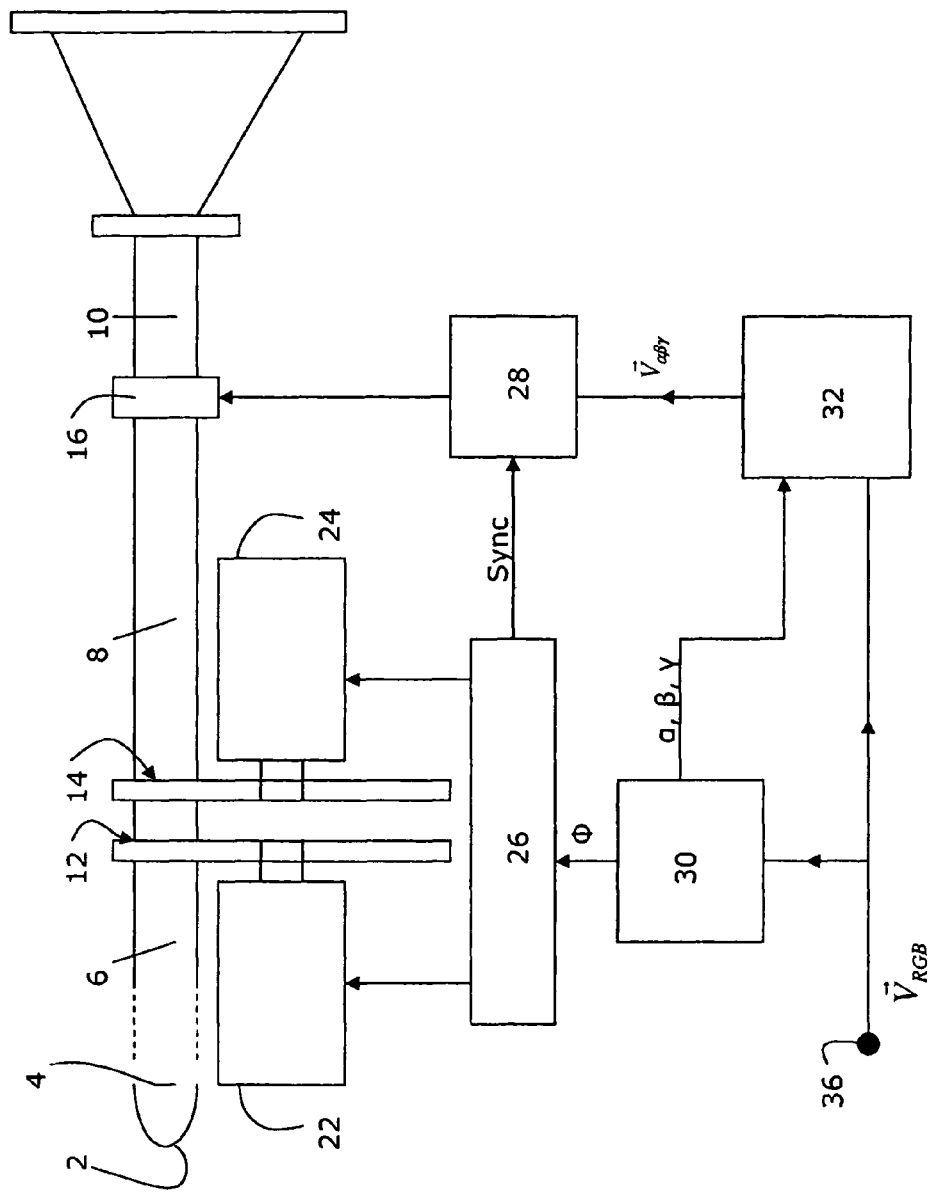
FIG. 1 represents an exemplary display device embodied in accordance with the teachings of the invention.

The display device represented in FIG. 1 is a mono-imager projector. It comprises a light source, represented here diagrammatically by the association of a reflector 2 and of a light source 4, which generates a polychromatic light beam 6 whose spectrum extends over the entire range of visible frequencies and that for greater simplicity we will therefore be able to refer to as a colourless beam, even if in reality the luminous power is in general not constant as a function of frequency. In this instance, by using a light source of the ultra-high pressure mercury vapour lamp type, the spectrum of the beam emanating from the source comprises mainly a blue line, a green line, a line of weak yellow power and a red part in continuum form.

The colourless beam 6 passes successively through a main coloured wheel 12 and a secondary coloured wheel 14 and therefore emerges in the form of a coloured light beam 8. Each coloured wheel 12, 14 comprises coloured filters in the form of sectors, as will be explained in detail hereinbelow. The main coloured wheel 12 is rotated by a first motor 22 while the secondary coloured wheel 14 is rotated by a second motor 24.

A control unit 26 operates the rotation of the first motor 22 and of the second motor 24 and dispatches a synchronization cue Sync to a drive 28 of a matrix imager (or modulator) 16, so as to synchronize the image generated by the imager 16 (that is to say the modulation performed at each point of the imager 16) with the colour of the coloured beam 8, as explained in detail subsequently.

Figure 2:
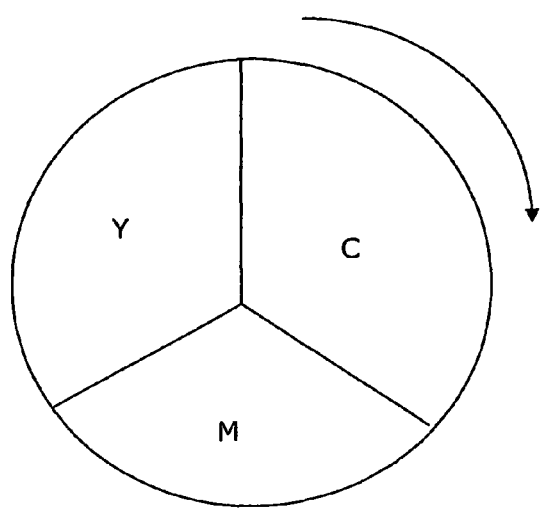
FIG. 2 represents a coloured wheel of the display device.

The main coloured wheel 12 and the secondary coloured wheel 14 are identical according to the preferred embodiment, namely both composed of three 120° angular sectors of respective colours yellow (Y), magenta (M) and cyan (C), as represented in FIG. 2.

The main coloured wheel 12 and the secondary coloured wheel 14 are parallel and are rotated in the same direction (with respect to the incident colourless beam) with an angular speed that is essentially identical during stabilized operation (apart from the possible phase shifts as explained hereinbelow). In the embodiment represented in FIG. 1, the first motor 22 and the second motor 24 which face one another therefore turn in opposite directions, with an essentially constant speed.

Through appropriate control of the first motor 22 and of the second motor 24 by virtue of the control unit 26, it is therefore possible to control the phase shift of the secondary coloured wheel 14 with respect to the main coloured wheel 12.

Figure 3:
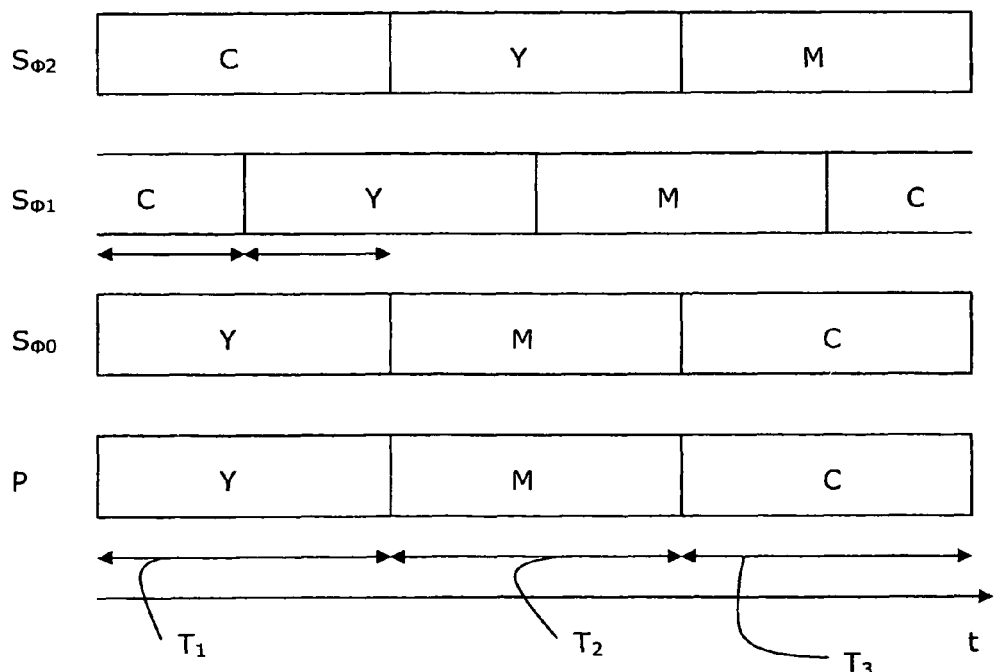
FIG. 3 represents the coloured filters traversed by the light beam as a function of time.

FIG. 3 represents the coloured filters Y, M or C traversed by the light beam over a rotation period of the main coloured wheel 12, in several cases of phase shift of the secondary coloured wheel 14.

In the example represented, the main 12 and secondary 14 coloured wheels turn in the clockwise direction viewed from the light source, as represented in FIG. 2; this implies a relative rotation in the trigonometric sense of the beam with respect to each wheel, and hence a coloration Y, then M, then C for each wheel.

In FIG. 3, the line P represents the coloured filters Y, M, C of the main coloured wheel 12 that are successively traversed by the incident colourless beam 6 over a rotation period of the wheel.

The lines $S_{\Phi 0}$, $S_{\Phi 1}$, $S_{\Phi 2}$ represent the coloured filters Y, M, C of the secondary coloured wheel 14 successively traversed by the beam, each for a determined value $\Phi 0$, $\Phi 1$, $\Phi 2$ of the phase shift of the secondary coloured wheel 14 with respect to the main coloured wheel 12. ($\Phi 0=0°$, $\Phi 1=60°$, $\Phi 2=120°$.)

It is recalled that a yellow filter Y stops the short wavelengths and hence the blue line B whereas it allows through the middle and large wavelengths (green line G and red part R of the spectrum). A magenta filter M for its part stops the middle wavelengths (green line G) and allows through the blue line B and the red continuum R. Finally, a cyan filter C stops the high wavelengths (red continuum R) and allows through the green V and blue B lines.

The successive passage through two filters of different colours will therefore allow through just one of the three colours (red R, green G, or blue B) according to the following rule:

yellow Y and magenta M allow through only red R;
yellow Y and cyan C allow through only green G;
magenta M and cyan C allow through only blue B.

Figure 4:
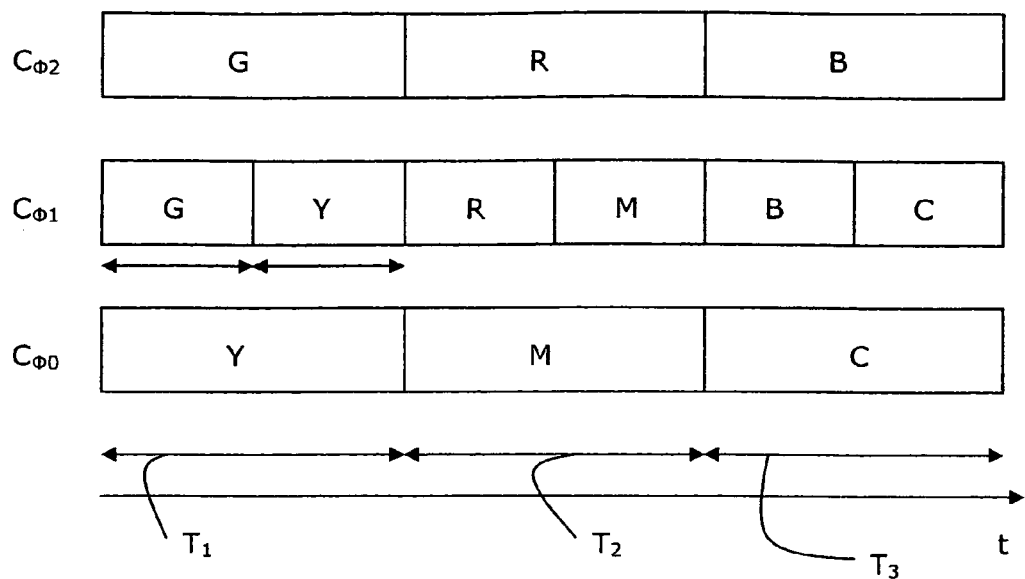
FIG. 4 represents the colour of the coloured beam as a function of time.

By applying these principles, the colour $C_{\Phi 0}$, $C_{\Phi 1}$, $C_{\Phi 2}$ of the coloured beam 8 resulting from the passage through the main coloured wheel 12 and the secondary coloured wheel 14 is therefore such as given in FIG. 4. Like FIG. 3, FIG. 4 represents a rotation period of the main coloured wheel 12 for the three values of phase shift ($\Phi 0$, $\Phi 1$ and $\Phi 2$.

It may already be seen that by virtue of the phase shift of the secondary coloured wheel 14 with respect to the main coloured wheel 12, it is possible to modify the hue of the successive colours (over a period) of the coloured beam 8.

As seen previously, the drive 28 controls the imager 16 in a manner synchronized with the rotation of the coloured wheels 12, 14 by virtue of the cue Sync. According to a possible embodiment, the imager 16 is driven so as to display images in correspondence with the coloured segments of the main coloured wheel 12. The imager 16 therefore modulates the coloured beam 8 according to a fixed image over each third of a period T1, T2, T3 during which one and the same coloured filter of the main coloured wheel 12 is traversed by the colourless beam 6.

As is clearly visible in FIG. 3 in the case of the phase shift $\Phi 1$, the beam may on the other hand pass successively through coloured filters of different colours over one and the same third of a period T1, T2, T3 on the secondary coloured wheel 14. In this case, as visible in FIG. 4, the colour of the coloured beam 8 may vary over one and the same third of a period T1, T2, T3; in a conventional chromaticity representation, the colour of the coloured beam 8 over a third of a period, which constitutes a primary colour for the display device, will then be the barycentre of the various colour points of the coloured beam 8, weighted by their duration over the third of a period.

Figure 5:
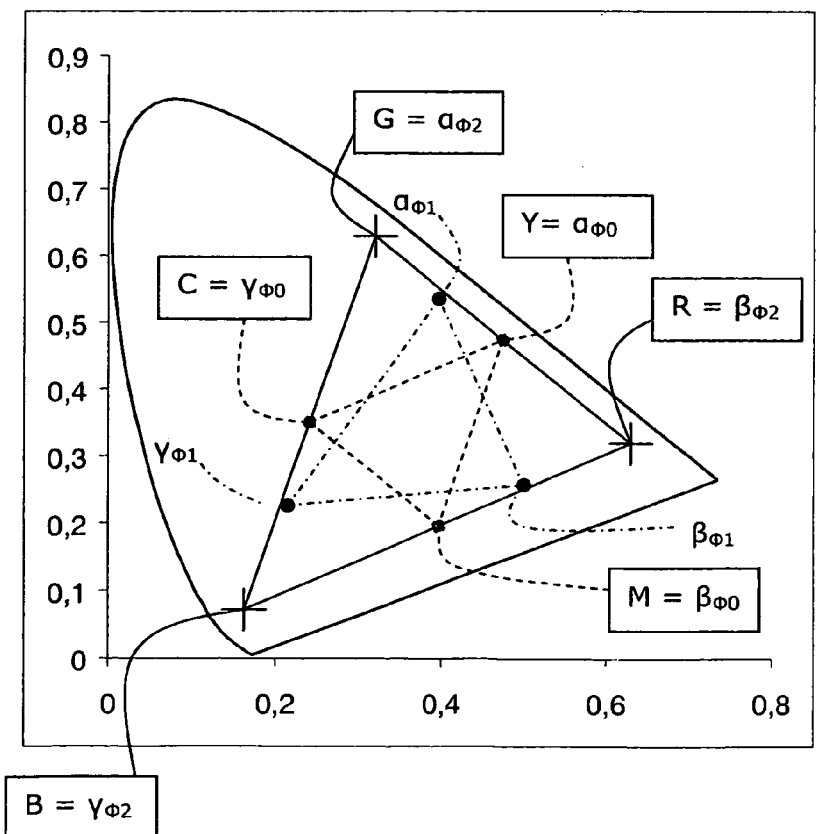
FIG. 5 represents the primary colours of the device for several configurations of the coloured wheels.

FIG. 5 thus represents the primary colours $\alpha_{\Phi i}$, $\beta_{\Phi i}$, $\gamma_{\Phi i}$ of the projector, that is to say the colours of the coloured beam 8 over each third of a period T1, T2, T3 during which the imager generates a fixed image, for the various values $\Phi i$ of the phase shift of the secondary coloured wheel 14 with respect to the main coloured wheel 12.

The primary colours $\alpha_{\Phi i}$, $\beta_{\Phi i}$, $\gamma_{\Phi i}$ are therefore the vertices of the triangle whose surface represents the whole set of colours displayable by the display device when the phase shift of the secondary coloured wheel 14 with respect to the main coloured wheel 12 equals $\Phi i$.

In a notable fashion, since over each third of a period T1, T2, T3 the filter of the main coloured wheel 12 traversed by the colourless beam 6 stops one of the parts of the spectrum (blue line, green line or red continuum), the corresponding primary colour $\alpha_{\Phi i}$, $\beta_{\Phi i}$, $\gamma_{\Phi i}$ is necessarily situated on the segment delimited by the other two lines (RB or RG or GB). The primary colours $\alpha_{\Phi i}$, $\beta_{\Phi i}$, $\gamma_{\Phi i}$ are therefore each situated on one side of the RGB triangle.

As is clearly visible in FIGS. 4 and 5, in the case of a phase shift equal to $\Phi 2=120°$, the primary colours are therefore green G, red R, blue B. It is understood that, in this case, the video data to be displayed received at the level of a video input 36 in a conventional format (CVBS or RGB for example) require only a conventional processing since the primary colours R, G, B are those generally used in video.

Conversely, for the other values of phase shift, such as for example $\Phi 0$ or $\Phi 1$, the primary colours $\alpha$, $\beta$, $\gamma$ (for example $\alpha_{\Phi 0}$, $\beta_{\Phi 0}$, $\gamma_{\Phi 0}$ or $\alpha_{\Phi 1}$, $\beta_{\Phi 1}$, $\gamma_{\Phi 1}$) are different from the conventional trio R, G, B and the coordinates of the colour to be displayed for each pixel in the primary colour reference system is therefore calculated within a processing unit 32.

On the basis of the video data received at the level of the video input 36 (these being expressed in a conventional manner in the form of a video vector $\vec{V}_{RGB}$ in the red R, green G, blue B colour reference system), the processing unit 32 calculates the data in the primary colour reference system $\alpha$, $\beta$, $\gamma$ (vector $\vec{V}_{\alpha\beta\gamma}$) by multiplication by a matrix $(M)_{RGB \to \alpha\beta\gamma}$ obtained on the basis of the coordinates of the primary colours $\alpha$, $\beta$, $\gamma$ in the R, G, B reference system.

$$\vec{V}_{\alpha\beta\gamma} = (M)_{RGB \to \alpha\beta\gamma} \cdot \vec{V}_{RGB}$$

The coordinates $\vec{V}_{\alpha\beta\gamma}$ of each pixel in the primary colour reference system $\alpha$, $\beta$, $\gamma$ therefore corresponds to the projection of the colour of the pixel onto the axes $(O\alpha)$, $(O\beta)$, $(O\gamma)$-O corresponding to black.

One thus obtains, for each pixel to be displayed, the values to be allocated to this pixel by means of the imager 16 controlled by the drive 28 during each third of a period T1, T2, T3, each third of a period T1, T2, T3 corresponding as has been seen to one of the primary colours $\alpha$, $\beta$, $\gamma$.

The projector also comprises an evaluation unit 30 which determines the primary colours $\alpha$, $\beta$, $\gamma$ to be used and the corresponding phase shift $\Phi$, preferably as a function of the video data received $\vec{V}_{RGB}$.

According to a possible embodiment, the angle of phase shift $\Phi$ chosen is such that, in the chromaticity chart, the triangle $T_\Phi$ having the corresponding primary colours $\alpha_\Phi$, $\beta_\Phi$, $\gamma_\Phi$ as vertices contains a determined part (for example 95%) of the colour points of a group of successive images. Of course, values other than 95% may be used, preferably greater than 90%.

To do this, one calculates for example the percentage $p_\Phi$ of colour points of the group of images (for example 12 successive images) for various values of $\Phi$ (over a span extending from $-120°$ to $120°$ or as a variant from $120°$ to $240°$); then one chooses the value of $\Phi$ such that $p_\Phi$ is as close as possible to 95%. If several values are suitable, it is possible to take the value $\Phi$ corresponding to the triangle $T_\Phi$ of minimum area, this corresponding to maximum brightness of the projector.

The phase shift $\Phi$ thus determined and the corresponding primary colours $\alpha$, $\beta$, $\gamma$ (see hereinabove and FIG. 5) are then transmitted respectively to the control unit 26 (for actual production of the phase shift of the secondary coloured wheel 14 with respect to the main coloured wheel 12) and to the processing unit 32 (for determination of the matrix $(M)_{RGB \to \alpha\beta\gamma}$ to be used to obtain the video data in the primary colour reference system $\alpha$, $\beta$, $\gamma$).

Preferably, the phase shift is determined periodically, for example with a frequency of 1 Hz.

By virtue of the arrangement just described, the projector uses primary colours optimized, in particular as regards their hue, as a function of the images that it is required to display.

Figure 6:
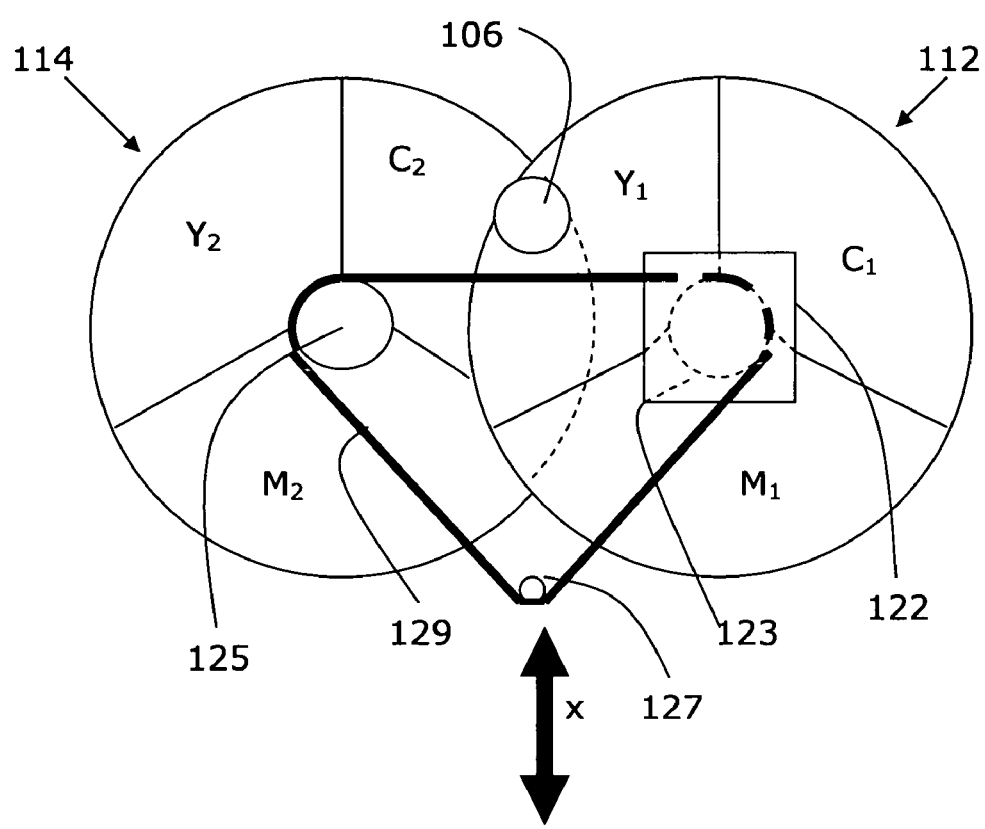
FIG. 6 represents a variant embodiment of the mechanism of the coloured wheels.

FIG. 6 represents a variant mechanical embodiment of the coloured wheels and of their control device.

According to this variant, the main coloured wheel 112 is rotated by a motor 122 at the level of its spindle 123 (as in FIG. 1). Moreover, an elastic belt 129 transmits the rotational motion of the spindle 123 of the main coloured wheel 112 to the spindle 125 of the secondary coloured wheel 114. Thus, in the normal regime (fixed phase shift), the secondary coloured wheel 114 has an angular velocity that is naturally identical to the main coloured wheel 112.

The elastic belt 129 is held under tension by means of an adjustable idler 127. By translating the adjustable idler 127 along the x direction, it is possible to modify the tension of the elastic belt 129 so as to obtain a brief acceleration or deceleration of the secondary coloured wheel 114 (with respect to the main coloured wheel 112). Thus, the phase shift $\Phi$ of the secondary coloured wheel 114 with respect to the main coloured wheel 112 can be made to vary.

It may also be noted that, in the embodiment of FIG. 6, the main coloured wheel 112 and the secondary coloured wheel 114 are essentially parallel but are not coaxial. The colourless beam 106 therefore passes through the two coloured wheels 112, 114 in a region where they overlap.

It is especially clear in this case that the phase shift $\Phi$ to be considered is not the angular difference of a sector (for example $Y_2$) of the secondary coloured wheel 114 with respect to the identical sector (in the example $Y_1$) of the main coloured wheel 112, but the difference on the coloured wheel such as represented in FIG. 2 between the angle where the second coloured wheel 114 receives the light beam 106 and the angle where the first coloured wheel 112 receives the light beam 106.

Thus, in FIG. 6, the phase shift of the secondary coloured wheel 114 with respect to the main coloured wheel 112 is of the order of $-60°$.

The invention is not limited to the embodiments just described. In particular, in order to limit the movements necessary for adjusting the phase shift of one coloured wheel with respect to the other, each coloured wheel may carry a greater number of sectors of reduced size, with repetitions of the various sector colours.

The invention claimed is:
1. Display device comprising:
   means of reception of a video signal;
   means of periodic generation of successive coloured beams taking successively at each period a plurality of determined primary colours, and comprising a first coloured wheel and a second coloured wheel successively traversed by a luminous beam, each coloured wheel carrying a plurality of coloured filtering sectors and being driven in rotation with an angular speed that is substantially identical;
   means of modulation of each of said coloured beams for generating during a determined duration an image to be displayed in each of said determined primary colours as a function of the received video signal;

means for modifying the determined primary colours by varying the position of the second coloured wheel relative to the first coloured wheel; and means of determination of the position of the second coloured wheel relative to the first coloured wheel as a function of the received video signal, wherein each of said determined primary colours is obtained as a result of at least two distinct colours taken successively by the colour beam during the determined duration of modulation of this colour beam for generating an image in this primary colour.

2. Display device comprising:

means of reception of a video signal;

means of periodic generation of successive coloured beams taking successively at each period a plurality of determined primary colours and comprising a first and a second identical coloured wheel successively traversed by a luminous beam, each coloured wheel carrying at least three coloured filtering sectors of respective colours yellow, magenta and cyan and being driven in rotation;

means of modulation of each of said coloured beams for generating during a determined duration an image to be displayed in each of said determined primary colours as a function of the received video signal;

means for modifying the determined primary colours by varying the phase shift of the second coloured wheel with respect to the first coloured wheel; and means of determination of the said phase shift as a function of the received video signal;

wherein each of said determined primary colours is obtained as a result of at least two distinct colours taken successively by the colour beam during the determined duration of modulation of this colour beam for generating an image in this primary colour.

* * * * *